United States Patent [19]
Innami et al.

[11] Patent Number: 6,037,554
[45] Date of Patent: Mar. 14, 2000

[54] CONSUMABLE ELECTRODE TYPE PULSED ARC WELDER AND CONTROLLING METHOD FOR THE SAME

[75] Inventors: Tetsu Innami, Osaka; Jingbo Wang, Amagasaki; Hideki Ihara, Takarazuka, all of Japan

[73] Assignee: Matsuhita Electric Industrial Co., Ltd., Osaka-fu, Japan

[21] Appl. No.: 09/039,868

[22] Filed: Mar. 16, 1998

[30] Foreign Application Priority Data

Mar. 19, 1997 [JP] Japan ................................ 9-065805

[51] Int. Cl.$^7$ ...................................... B23K 9/09
[52] U.S. Cl. .............................. 218/130.51; 218/130.21; 218/137 PS
[58] Field of Search .................. 219/130.51, 130.21, 219/130.31, 130.32, 130.33, 137 PS, 130.1

[56] References Cited

U.S. PATENT DOCUMENTS 4,594,498  6/1986  Ueguri et al. ...................... 219/130.51

FOREIGN PATENT DOCUMENTS

| 0 342 691 A2 | 11/1989 | European Pat. Off. . |
| 0 715 921 A2 | 6/1996 | European Pat. Off. . |
| 61-17369 | 1/1986 | Japan . |
| 01254385 | 10/1989 | Japan . |
| 2171267 | 8/1986 | United Kingdom .................. 219/130 |
| 2 267 162 | 11/1993 | United Kingdom . |

*Primary Examiner*—Clifford C. Shaw
*Attorney, Agent, or Firm*—Akin, Gump, Strauss, Hauer & Feld, L.L.P.

[57] ABSTRACT

A consumable electrode type pulsed arc welder and a controlling method for the same, wherein at least one of a welding current and a welding voltage is output to a wire in accordance with a duty time of a pulse waveform group comprising a first pulse period to form a droplet having a predetermined amount at an end of the wire, a base period to shorten an arc length between the droplet and a base metal, and a second pulse period to detach the droplet.

6 Claims, 8 Drawing Sheets

FIG. 8A
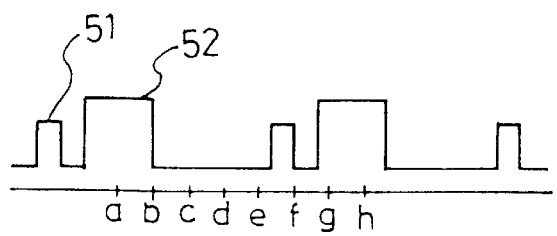
FIG. 8B
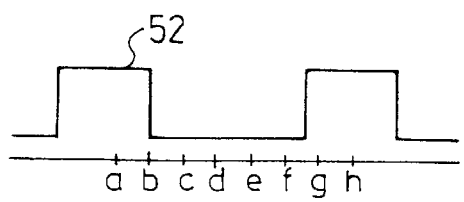
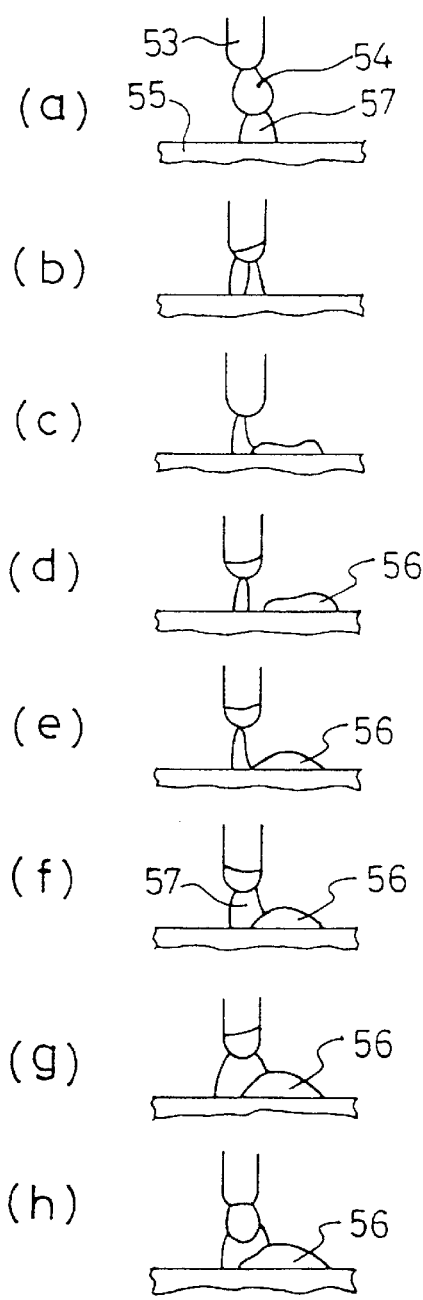
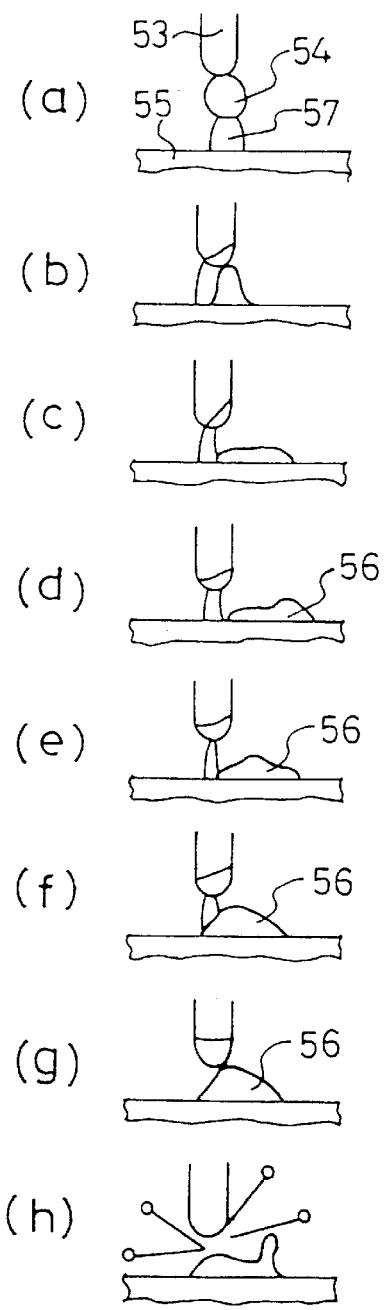

CONSUMABLE ELECTRODE TYPE PULSED ARC WELDER AND CONTROLLING METHOD FOR THE SAME

BACKGROUND OF THE INVENTION

The present invention relates to a consumable electrode type pulsed arc welder using a shielding gas of $CO_2$ gas as its main composition, and a controlling method for the same.

Recently, a consumable electrode type pulsed arc welder using a shielding gas mainly comprising $CO_2$ gas which is less expensive than a prior inert gas (e.g., argon gas) has been used widely. This consumable electrode type pulsed arc welder using $CO_2$ gas has advantages of low running cost and forming a superior welded joint. In this kind of consumable electrode type pulsed arc welder, it is required to suppress spatter generation as a technological problem to be solved. It is known that the spatter generation can be decreased by dividing a single pulse into a plurality of different pulses.

A conventional consumable electrode type pulsed arc welder disclosed in unexamined and published Japanese patent application TOKKAI (Hei) No. 1-254385 for example will be explained with reference to FIGS. 8A and 8B concretely.

FIG. 8A is a schematic view showing the relation between a pulse waveform and the conditions of a droplet and an arc at a tip of a wire in the conventional consumable electrode type pulsed arc welder. FIG. 8B is a schematic view showing the relation between another pulse waveform and the conditions of the droplet and the arc at the tip of the wire in the conventional consumable electrode type pulsed arc welder. In FIGS. 8A and 8B, (a) to (h) are drawings illustrating the conditions of a droplet 54 and an arc 57 at a tip of a wire 53 at the respective times a to h on each time-base axis of pulse waveforms.

In the conventional consumable electrode type pulsed arc welder, as shown in FIG. 8A, a first pulse current 51 and a second pulse current 52 larger than the first pulse current 51 are output alternately at predetermined intervals to the wire 53 as a consumable electrode. The second pulse current 52 melts the tip of the wire 53, so as to form the droplet 54 at the tip. In addition, the second pulse current 52 drops the droplet 54 in an arc-area generating the arc 57, so that the droplet 54 is transferred into a weld pool 56 on a base metal 55.

The first pulse current 51 controls the behavior of the weld pool 56 by using its arc force in order to prevent the droplet 54 formed and grown by the second pulse current 52 from shorting against the weld pool 56 during the period from the time b to the time h in FIG. 8A. That is, in the conventional consumable electrode type pulsed arc welder, the arc force generated by the first pulse current 51 prevents the weld pool 56 from approaching the droplet 54 formed at the tip of the wire 53, thereby preventing a short circuiting between the droplet 54 and the weld pool 56. This is evident from the fact that when the first pulse current 51 is not output, the droplet 54 formed by the second pulse current 52 is grown further by the next second pulse current 52, resulting in contacting and short-circuiting to the weld pool 56 as shown in FIG. 8B.

In the conventional consumable electrode type pulsed arc welder, as has been explained in the above, the arc force generated by the first pulse current 51 is used to control the behavior of the weld pool 56. Therefore, the output of the first pulse current 51 is required to satisfy the following conditions (I) and (II).

(I) The arc force can control the behavior of the weld pool 56 approaching the tip of the wire 53.

(II) The droplet 54 is not transferred from the tip of the wire 53 to the base metal 55.

In other words, in the conventional consumable electrode type pulsed arc welder, the first pulse current 51 is required to be adjusted to have a value enough to control the behavior of the weld pool 56 but smaller than that of the second pulse current 52.

However, in the conventional consumable electrode type pulsed arc welder, two pulse currents having different values are required to be output as described above. Thereby, the arc-area is in an unstable state wherein the droplet 54 is dropped and transferred from the tip of the wire 53 to the base metal 54. As a result, in the conventional consumable electrode type pulsed arc welder, the droplet 54 is not dropped and transferred stably but resulting in the spatter generation.

BRIEF SUMMARY OF THE INVENTION

The object of the present invention is to provide a consumable electrode type pulsed arc welder and a controlling method for the same that can solve the aforementioned problems in the conventional apparatus and can be configured with less cost and has a long life.

In order to achieve the above-mentioned object, a consumable electrode type pulsed arc welder is configured such that:

at least one of a welding current and a welding voltage is output to the consumable electrode in accordance with a duty time of a pulse waveform group, the pulse waveform group comprising a first pulse period to form a droplet having a predetermined amount at an end of the consumable electrode, a base period to shorten an arc length between the droplet and the base metal, and a second pulse period to detach the droplet.

According to the consumable electrode type pulsed arc welder of the present invention, the droplet can be formed at the tip of the consumable electrode during the first pulse period, and the arc length can be shortened during the base period. Therefore, the area of anode spot generated between the tip of the consumable electrode and the base metal can be made wider. Consequently, in subsequent second pulse period a class II pinch force can be increased, so that the droplet can be detached easily.

In the consumable electrode type pulsed arc welder of another aspect of the present invention, the duration of the first pulse period is changed depending on a feeding speed of the consumable electrode.

With this configuration, the amount of the droplet to be formed during the first pulse period can be made appropriate, and the droplet can be detached easily.

In the consumable electrode type pulsed arc welder of another aspect of the present invention, the duration of the base period is changed depending on the feeding speed of the consumable electrode.

With this configuration, any short circuiting between the droplet and the base metal can be prevented certainly.

In the consumable electrode type pulsed arc welder of another aspect of the present invention, the duration of the second pulse period is set shorter than that of the first pulse period.

With this configuration, spatter generation can be prevented securely, and the droplet can be detached easily.

In the consumable electrode type pulsed arc welder of another aspect of the present invention, the duration of the first pulse period is determined on the basis of pulse output during the first pulse period.

With this configuration, the amount of the droplet to be formed during the first pulse period can be made appropriate.

In the consumable electrode type pulsed arc welder of another aspect of the present invention, the duration of the base period is determined on the basis of pulse output during the first pulse period, the duration of the first pulse period and the feeding speed of the consumable electrode.

With this configuration, the increment of the arc length generated during the first pulse period can be decreased securely during the base period. Consequently, any short circuiting between the droplet and the base metal can be prevented, and the droplet can be detached easily during the second pulse period.

In the consumable electrode type pulsed arc welder of another aspect of the present invention, arc impedance detection means for detecting the impedance of an arc during the base period are provided so that the base period is ended by the output signal of the arc impedance detection means.

With this configuration, the arc length can be detected. Consequently, any short circuiting between the droplet and the base metal can be prevented, and the droplet can be detached easily during the second pulse period.

In the consumable electrode type pulsed arc welder of another aspect of the present invention, a detaching detection means for detecting the detaching of the droplet are provided so that the second pulse period is ended by the output signal of the detaching detection means.

With this configuration, an arc force exerted on the droplet, which is in an unstable state until it is absorbed into a weld pool, can be weakened to prevent the droplet from generating spatter.

A controlling method for the consumable electrode type pulsed arc welder for outputting pulses to a consumable electrode and melting the consumable electrode in order to weld a base metal, comprises a pulse waveform group for outputting at least one of a welding current and a welding voltage to the consumable electrode, the pulse waveform group comprises a first pulse period to form a droplet having a predetermined amount at an end of the consumable electrode, a base period to shorten an arc length between the droplet and the base metal, and a second pulse period to detach the droplet.

According to the controlling method for the consumable electrode type pulsed arc welder, a droplet can be formed at the tip of the consumable electrode during the first pulse period, and the arc length can be shortened during the base period. Therefore, the area of anode spot generated between the tip of the consumable electrode and the base metal can be made wider. Consequently, the class II pinch force can be increased, so that the droplet can be detached easily.

BRIEF DESCRIPTION OF THE SEVERAL VIEWS OF THE DRAWING

FIG. 8A is a schematic view showing the relation between a pulse waveform and the conditions of a droplet and an arc at a tip of a wire in the conventional consumable electrode type pulsed arc welder.

FIG. 8B is a schematic view showing the relation between another pulse waveform and the conditions of the droplet and the arc at the tip of the wire in the conventional consumable electrode type pulsed arc welder.

DETAILED DESCRIPTION OF THE INVENTION

The preferred embodiments of a consumable electrode type pulsed arc welder and a controlling method for the same of the present invention will be described with reference to the accompanying drawings.

<<GENERIC EMBODIMENT>>

Figure 7:
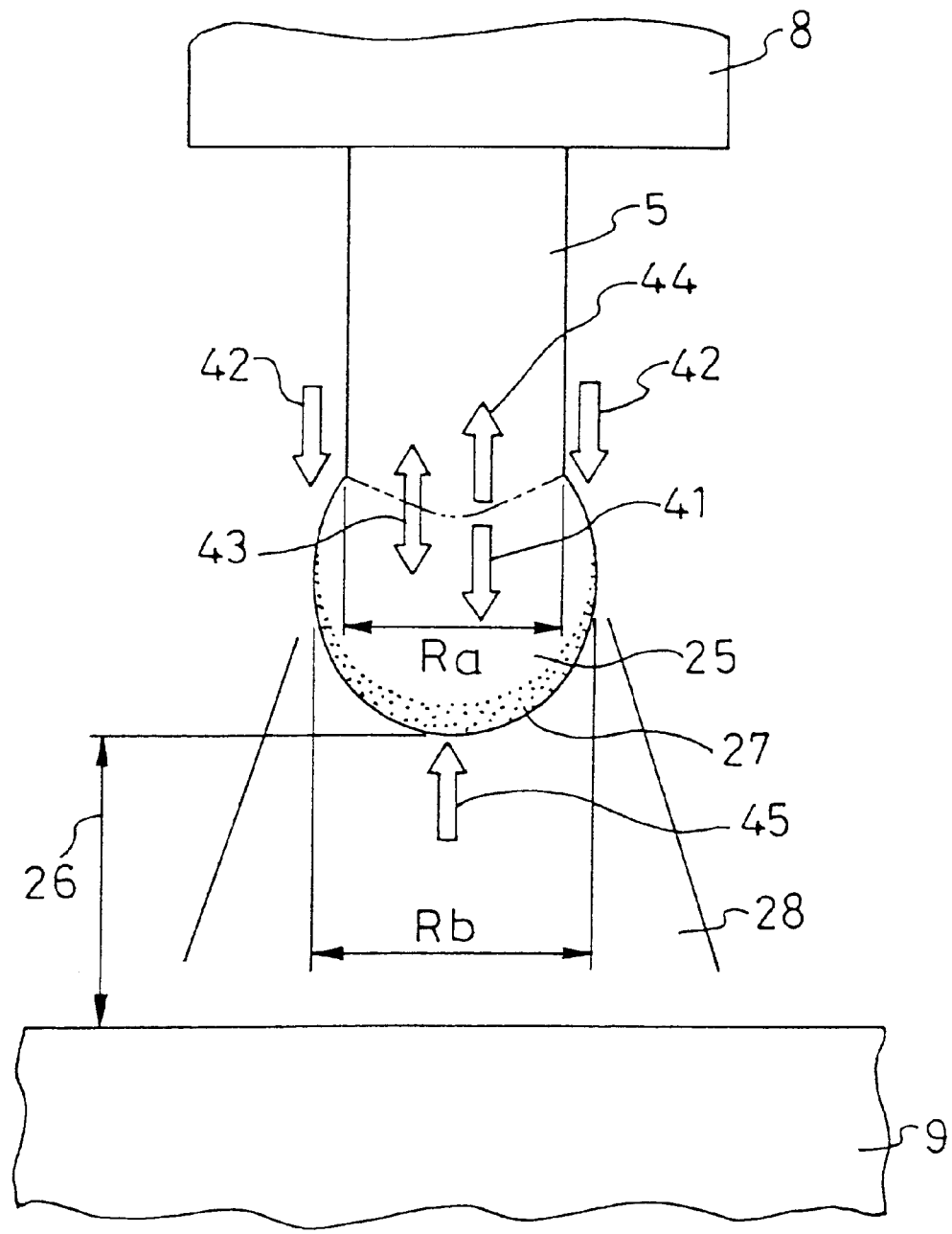
FIG. 7 is an explanatory view showing forces exerted on the droplet generated at the tip of the wire in the consumable electrode type pulsed arc welder of the present invention.

First, the subject matter of the present invention, namely, a consumable electrode type pulsed arc welder and a controlling method of the present invention will be elucidated with reference to FIG. 7.

FIG. 7 is an explanatory view showing forces exerted on the droplet generated at the tip of the wire in the consumable electrode type pulsed arc welder of the present invention.

Figure 1:
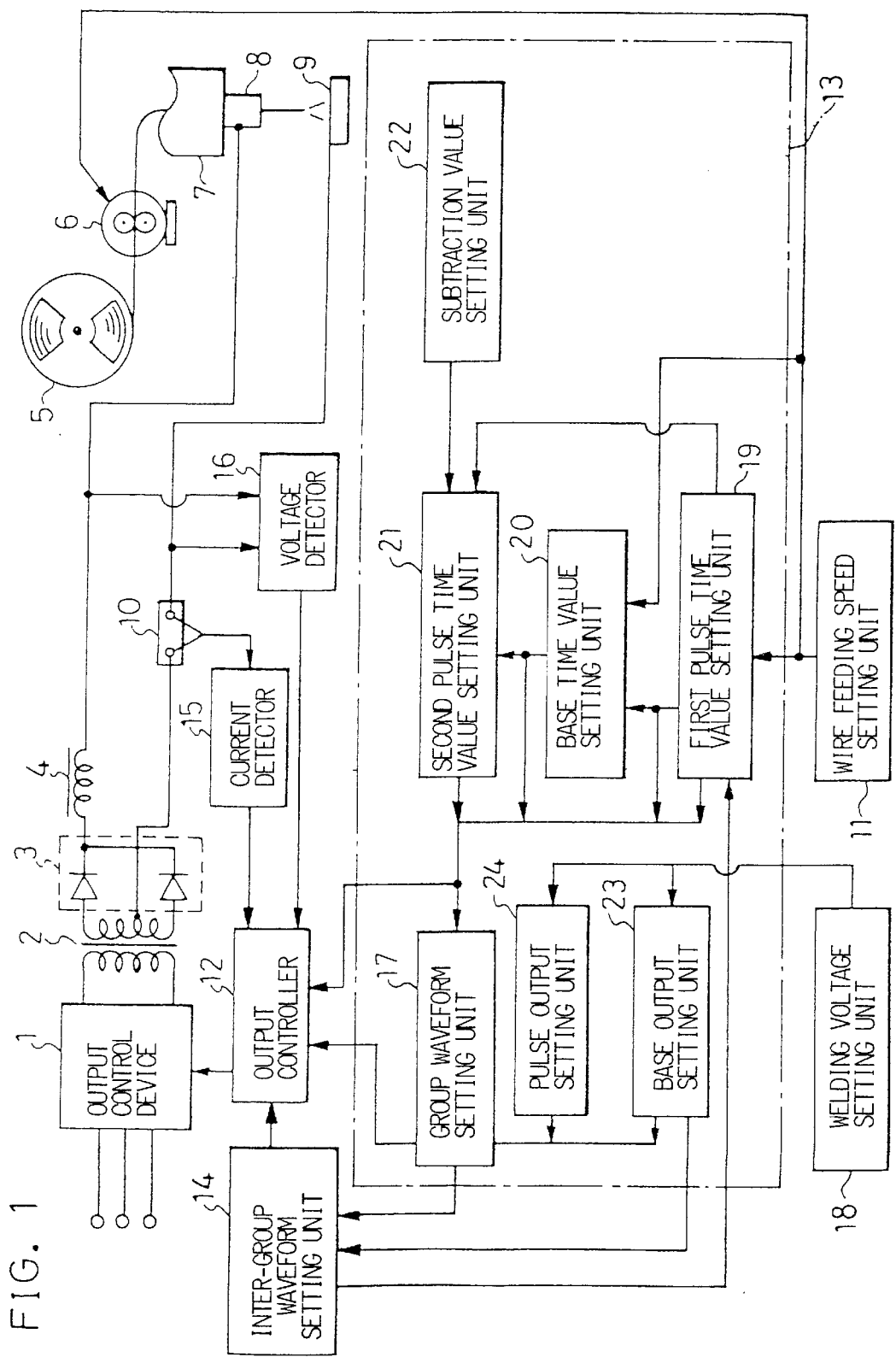
FIG. 1 is a block diagram showing a configuration of a consumable electrode type pulsed arc welder in a first embodiment of the present invention.

In FIG. 7, a wire 5 as a consumable electrode protrudes toward a base metal 9 at a tip end of an electrode 8. The wire 5 is formed of metal wire having a diameter of 0.8 to 1.6 mm, and fed toward the base metal 9 at a predetermined wire feeding speed (10 cm/min., for example) by a wire feed motor 6 (FIG. 1). At least one of a welding current and a welding voltage is output to the wire 5 via the electrode 8 in accordance with a duty time in a pulse waveform group comprising a first pulse period to form a droplet 25 having a predetermined amount at a tip of the wire 5, a base period to shorten an arc length 26 between the droplet 25 and the base metal 9, and a second pulse period to detach the droplet 25. Thereby, an arc 28 is generated between the wire 5 and the base metal 9. By the energy of this arc 28, the tip of the wire 5 is melted, so that the droplet 25 is formed at the tip of the wire 5, and the droplet 25 is transferred to the base metal 9 by droplet transfer.

As shown in FIG. 7, gravity 41 and a friction force 42 with a plasma jet of the arc 28 are applied to the droplet 25 as forces exerted in a detaching direction for detaching the droplet 25 from the end of the wire 5. In addition, as forces exerted in a direction opposite to the detaching direction, namely, in a prevention direction for preventing the droplet 25 from being detached, a surface tension 44 and an arc force 45 are exerted on the droplet 25. Furthermore, a class II pinch force 43 is also exerted on the droplet 25 in the detaching direction or the prevention direction depending on the conditions of the droplet 25.

In the consumable electrode type pulsed arc welder and the controlling method of the present invention, at least one of the welding current passing through the wire 5 and the welding voltage applied to the wire 5 is output so as to conform to the duty time in the pulse waveform group comprising the first pulse period, the base period and the second pulse period as described above. Therefore, in the consumable electrode type pulsed arc welder and the controlling method of the present invention, the class II pinch force 43 can be exerted in the detaching direction on the droplet 25 having grown to have a predetermined weight, namely, a predetermined amount. As a result, in the consumable electrode type pulsed arc welder and the controlling method of the present invention, the detaching of the droplet 25 can be stabilized and quickened, and thereby to prevent spatter generation.

The class II pinch force 43 is explained specifically. A contact dimension (contact diameter) Ra, wherein the droplet 25 makes contact with the solid portion of the wire 5, corresponds to the diameter of the wire 5 at the tip thereof. However, as the detaching of the droplet 25 proceeds, a constriction is generated on the contact surface between the solid portion of the wire 5 and the droplet 25, and the contact dimension Ra becomes smaller. In the end, the droplet 25 is completely detached from the wire 5. A dimension Rb represents the maximum dimension of an area 27 of anode spot formed at an end portion of the droplet 25. In the following explanations, all cross sections of current passages between the tip of the wire 5 and the base metal 9 are assumed to be concentric for facilitation.

As is known in the art, the pinch force is a force exerted between the solid portion of the wire 5 and the droplet 25, and the force is caused by an electromagnetic force of the welding current.

In the case of Ra=Rb, namely, in the case that the current passage is constant, the electromagnetic force is generated in a direction perpendicular to the direction of the current passage and the magnetic field formed by the current elements thereof, that is, in the direction toward the center of the current passage. This force is generally referred to as a class I pinch force.

In actual welding, however, the current passage is generally not constant as shown in FIG. 7. In other words, Ra is not equal to Rb. In this case, the direction of the electromagnetic force is inclined toward an axial direction of the current passage. Therefore, a component of the electromagnetic force is generated in the axial direction of the current passage, and this component is involved with the detaching of the droplet 25, and is referred to as the class II pinch force. A value F of the class II pinch force 43 is represented by the below-mentioned equation (1), wherein $\mu$ designates magnetic permeability, and I designates the welding current. In the equation (1), the detaching direction of the droplet 25 is determined to be a positive direction.

$$F = \frac{\mu}{4\pi} \cdot I^2 \cdot \log\frac{Rb}{Ra}$$

As is obvious in the equation (1), in the case of Ra>Rb, the class II pinch force 43 is exerted on the droplet 25 in the prevention direction for preventing the droplet 25 from being detached. On the other hand, in the case of Ra<Rb, the class II pinch force 43 is exerted on the droplet 25 in the direction for quickening the detaching of the droplet 25. In addition, the class II pinch force 43 becomes larger in proportion to the logarithm of the ratio of the diameter Ra of the wire 5 to the maximum dimension Rb of the area 27 of anode spot. For this reason, assuming that the diameter Ra of the wire 5 is constant, it is understood that the class II pinch force 43 is increased in the detaching direction of the droplet 25 when the maximum dimension Rb of the area 27 of anode spot is made larger. On the basis of the equation (1), it is apparent that the class II pinch force 43 becomes larger during a pulse period in which a large current flows than during a base period during which a small current flows, since the class II pinch force 43 is proportional to the square of the welding current.

As has been explained in the above, in order to facilitate the detaching of the droplet 25 by using the class II pinch force 43, the relation of Rb>Ra should be established, that is, the area 27 of anode spot should be made wider.

By directing attention to the fact that the area 27 of anode spot became wider as the arc length 26 was shorter, the inventors of the present invention formed the pulse waveform group comprising the first pulse period, the base period and the second pulse period as described above. Thereby, in the consumable electrode type pulsed arc welder and the controlling method of the present invention, the droplet 25 having the predetermined amount was formed at the tip of the wire 5 during the first pulse period. Hereafter, the arc length 26 was shortened, and thereby the area 27 of anode spot was able to be widened during the base period. As a result, the class II pinch force 43 having a larger value was exerted on the droplet 25 during the second pulse period. Consequently, the detaching of the droplet 25 was able to be stabilized and quickened without generating the spatter.

The feeding speed of the wire 5 can be changed by changing the rotation speed of the wire feed motor 6. Therefore, in the case that the feeding speed of the wire 5 is increased, the first pulse period is set shorter so that the droplet 25 has the predetermined amount during the first pulse period.

It is preferable that the capability of melting the wire 5 is lowered during the base period in order to shorten the arc length 26. In other words, either the welding current or the welding voltage to be output during the base period should preferably be smaller than that during the first and second pulse periods. Furthermore, in the case that the feeding speed of the wire 5 is increased, an approaching speed of the tip of the wire 5 to the base metal 9 is also increased. Therefore, in the case that the feeding speed of the wire 5 is increased, the base period is set shorter.

As has been explained in the above, in the consumable electrode type pulsed arc welder and the controlling method of the present invention, the first pulse period and the base period are changed in accordance with the feeding speed of the wire 5. By this change, it is possible to prevent the spatter generation, and thereby to stably drop the droplet 25 in a state of the droplet transfer.

Once the droplet 25 enters the process of detaching, the constriction is generated between the wire 5 and the droplet 25, and the contact dimension Ra becomes smaller with time. Therefore, the class II pinch force 43 becomes larger, and the detaching process is accelerated. Accordingly, the time to the end of the detaching process, i.e., the second pulse period should be made shorter than the first pulse period during to form the droplet 25.

If the second pulse period is made longer than the first pulse period so that the second pulse period remains even after the droplet 25 is detached, another droplet 25 is formed in the second pulse period and detached in the middle of the next first pulse period. Therefore, the effect of increasing the class II pinch force 43 in the present invention cannot be obtained in this case.

<<FIRST EMBODIMENT>>

Figure 2:
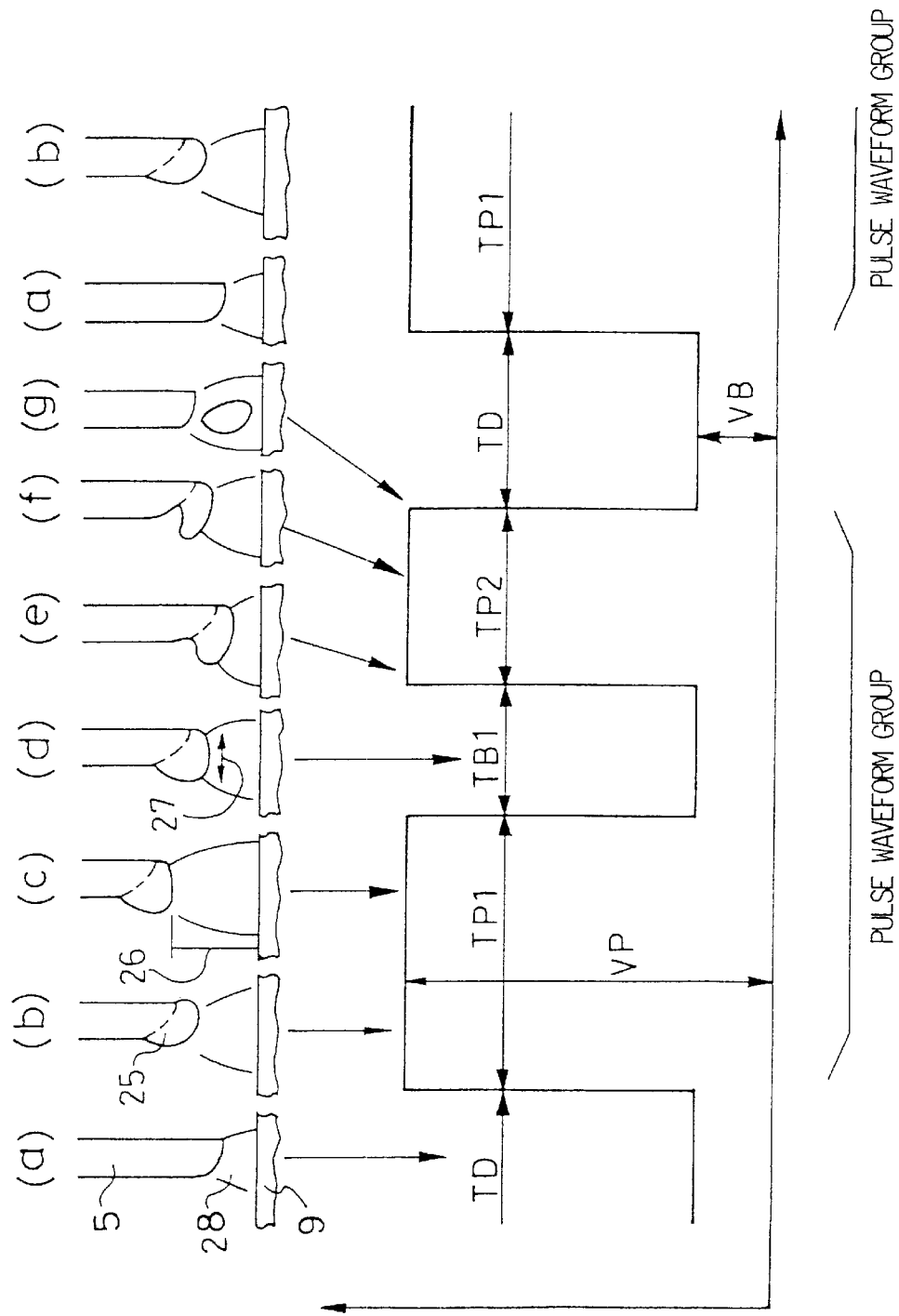
FIG. 2 is a schematic view showing the relation between a pulse waveform and the conditions of a droplet and an arc at the tip of a wire in the consumable electrode type pulsed arc welder shown in FIG. 1.

FIG. 1 is a block diagram showing a configuration of a consumable electrode type pulsed arc welder in a first embodiment of the present invention. FIG. 2 is a schematic view showing the relation between a pulse waveform and the conditions of a droplet and an arc at a tip of a wire in the consumable electrode type pulsed arc welder shown in FIG. 1.

In FIG. 1, the consumable electrode type pulsed arc welder of the present embodiment comprises an output control device 1 connected to, for example, a three-phase AC power source (not shown), a transformer 2 for reducing an output of the output control device 1 to a voltage suited for welding, a rectifier 3 including diodes and used for rectifying an output of the transformer 2, and a reactor 4 connected between the rectifier 3 and the electrode 8. The consumable electrode type pulsed arc welder comprises the wire feed motor 6 for feeding the wire 5, a cylindrical welding torch 7 for supporting the electrode 8, and a shunt 10 for detecting the welding current flowing through the base metal 9. A shielding gas mainly comprising $CO_2$ gas is sprayed toward the base metal 9 in the direction parallel to the wire 5 from around the electrode 8 of the welding torch 7, so as to stabilize the condition of an arc.

The consumable electrode type pulsed arc welder is provided with a wire feeding speed setting unit 11 for setting the rotation speed of the wire feed motor 6, i.e., for setting the feeding speed of the wire 5, and an output controller 12 for controlling the output of the output control device 1. The consumable electrode type pulsed arc welder further comprises a group waveform forming section 13 for forming the above-mentioned pulse group waveform and for giving instructions to the output controller 12, and an inter-group waveform setting unit 14 for setting a waveform between two pulse group waveforms during an inter-group base period. A current detector 15 for receiving a detection signal from the shunt 10 in order to detect the welding current, and a voltage detector 16 for detecting the welding voltage are connected to the output controller 12. A welding voltage setting unit 18 for setting the welding voltage is connected to the group waveform forming section 13.

The wire feeding speed setting unit 11 is provided with ROM or a similar memory device (not shown). A plurality of a first pulse time value TP1 during the first pulse period and a plurality of a base time value TB1 during the base period each corresponding to a plurality of the feeding speed capable of being set in the wire feeding speed setting unit 11 have been stored beforehand in the memory device. When the feeding speed is set by an operator or the like, the wire feeding speed setting unit 11 outputs the feeding speed to the wire feed motor 6. Furthermore, the wire feeding speed setting unit 11 outputs a pair of the first pulse time value TP1 and the base time value TB1 corresponding to the feeding speed set therein to the group waveform forming section 13.

The group waveform forming section 13 forms the above-mentioned pulse group waveform on the basis of input values from the wire feeding speed setting unit 11 and the welding voltage setting unit 18, and on the basis of an inter-group waveform stop signal from the inter-group waveform setting unit 14. The group waveform forming section 13 comprises a group waveform setting unit 17 for setting a formed pulse group waveform in the output controller 12. The group waveform forming section 13 further comprises a first pulse time value setting unit 19, a base time value setting unit 20 and a second pulse time value setting unit 21, for outputting the first pulse time value TP1, the base time value TB1 and a second pulse time value TP2, these functioning as time share signals, respectively, to the group waveform setting unit 17. In addition, the group waveform forming section 13 comprises a subtraction value setting unit 22 having a predetermined subtraction value and connected to the second pulse time value setting unit 21, a base output setting unit 23 for outputting a base output value VB to the group waveform setting unit 17 during the base period and the inter-group base period, and a pulse output setting unit 24 for outputting a pulse output value VP to the group waveform setting unit 17 during the first and second pulse periods.

The first pulse time value setting unit 19 receives the first pulse time value TP1 from the wire feeding speed setting unit 11, and outputs the first pulse time value TP1 to the second pulse time value setting unit 21. The first pulse time value setting unit 19 starts to count a time when the first pulse time value setting unit 19 receives an inter-group waveform stop signal from the inter-group waveform setting unit 14. When a counted time value coincides with the first pulse time value TP1 input from the wire feeding speed setting unit 11, the first pulse time value setting unit 19 outputs a first count termination signal to the base time value setting unit 20 and the group waveform setting unit 17.

The base time value setting unit 20 starts to count a time when the base time value setting unit 20 receives the first count termination signal from the first pulse time value setting unit 19. When a counted time value coincides with the base time value TB1 input from the wire feeding speed setting unit 11, the base time value setting unit 20 outputs a second count termination signal to the second pulse time value setting unit 21 and the group waveform setting unit 17.

The second pulse time value setting unit 21 subtracts the subtraction value of the subtraction value setting unit 22 from the first pulse time value TP1 of the first pulse time value setting unit 19, so as to calculate the second pulse time value TP2. The second pulse time value setting unit 21 starts to count a time when the second pulse time value setting unit 21 receives the second count termination signal from the base time value setting unit 20. When a counted time value coincides with the second pulse time value TP2 obtained by calculation, the second pulse time value setting unit 21 outputs a third count termination signal to the output controller 12 and the group waveform setting unit 17.

Operation of the consumable electrode type pulsed arc welder of the present embodiment will be described below.

A welding output is subjected to output control by the output control device 1 in accordance with the signal of the output controller 12, and rectified by the rectifier 3 through the transformer 2. Hereafter, the welding output is smoothed by the reactor 4 and supplied between the electrode 8 and the base metal 9. The wire 5 is fed to a welding portion by the wire feed motor 6 controlled by the signal of the wire feeding speed setting unit 11. In the meantime, electric power is supplied to the wire 5 via the electrode 8, and an arc condition occurs between the tip of the wire 5 and the base metal 9. The wire 5 melted by the energy of the arc is transferred to the base metal 9, thereby performing welding.

The output controller 12 receives the pulse group waveform from the group waveform setting unit 17 of the group waveform forming section 13, and also receives the inter-group base waveform between the two pulse group waveforms from the inter-group waveform setting unit 14. In addition, the output controller 12 receives a feedback value of the welding current detected by the current detector 15 via the shunt 10 and a feedback value of the welding voltage detected by the voltage detector 16, and performs current control or voltage control based upon the corresponding feedback value. In the current control or the voltage control, switching of periods in the pulse group waveform is carried out on the basis of the above-mentioned time-share signals TP1, TB1 and TP2 from the group waveform forming section 13.

The pulse waveform group forming operation at the group waveform forming section 13 will be explained with reference to FIG. 1 and FIG. 2 specifically.

First, time setting operation at each duration of the periods is described below.

The first pulse time value setting unit 19 starts to count a time when the first pulse time value setting unit 19 receives an inter-group waveform termination signal from the inter-group waveform setting unit 14, and continues the time count until the counted time value coincides with the first pulse time value TP1 input from the wire feeding speed setting unit 11. When the counted time value reaches the first pulse time value TP1, the first pulse time value setting unit 19 outputs the first count termination signal to the base time value setting unit 20 and the group waveform setting unit 17. At the same time, the first pulse time value setting unit 19 outputs the first pulse time value TP1 to the second pulse time value setting unit 21. The first pulse time value TP1 functions as a time value for controlling the amount of the droplet 25 to be formed at the tip of the wire 5. Therefore, when the wire feeding speed is increased for example, the wire feeding speed setting unit 11 selects a smaller time value as the first pulse time value TP1, and outputs the smaller time value to the first pulse time value setting unit 19 in order to adjust the amount of droplet at the predetermined amount.

The base time value setting unit 20 starts to count a time when the base time value setting unit 20 receives the first count termination signal from the first pulse time value setting unit 19, and continues the time count until the counted time value coincides with the base time value TB1 from the wire feeding speed setting unit 11. When the counted time value reaches the base time value TB1, the base time value setting unit 20 outputs the second count termination signal to the second pulse time value setting unit 21 and the group waveform setting unit 17. Since the amount of the wire to be melted becomes smaller than that of the wire to be fed during the base period, the tip of the wire 5 approaches the base metal 9 with time. Therefore, when the wire feeding speed is increased for example, the wire feeding speed setting unit 11 selects a smaller time value as the base time value TB1, and outputs the smaller time value to the base time value setting unit 20 in order to prevent a short circuiting between the droplet 25 and the base metal 9.

The second pulse time value setting unit 21 starts to count a time when second pulse time value setting unit 21 receives the second count termination signal from the base time value setting unit 20, and continues the time count until the counted time value coincides with the second pulse time value TP2 obtained by calculation. When the counted time value reaches the second pulse time value TP2, the second pulse time value setting unit 21 outputs the third count termination signal to the output controller 12 and the group waveform setting unit 17. In this way, the time-share signals TP1, TB1 and TP2 are input to the group waveform setting unit 17 in sequence.

Welding voltage setting operation during each period will be described below.

The base output setting unit 23 determines the base setting value VB during the base period and the inter-group base period on the basis of the welding voltage set in the welding voltage setting unit 18, and outputs the base setting value VB to the group waveform setting unit 17. Thereby, the group waveform setting unit 17 generates a pulse waveform used in the base period.

In the same way, the pulse output setting unit 24 determines the pulse setting value VP during the first and second pulse periods on the basis of the welding voltage set in the welding voltage setting unit 18, and outputs the pulse setting value VP to the group waveform setting unit 17. Thereby, the group waveform setting unit 17 generates pulse waveforms used in the first and second pulse periods.

The pulse waveform group obtained as described above is continually output with an inter-group base time value TD therebetween set by the inter-group waveform setting unit 14. The inter-group waveform setting unit 14 starts outputting the base setting value VB from the base output setting unit 23 during the inter-group base period when the inter-group waveform setting unit 14 receives the inter-group waveform termination signal.

The relation between the pulse waveform group obtained as described above and the conditions of the droplet 25 and the arc at the tip of the wire 5 will be explained with reference to FIG. 2. The conditions of the droplet 25 at the tip of the wire 5 are shown at (a) to (g) of FIG. 2, and the conditions corresponding to the welding voltage waveform shown below with respect to time are indicated by arrows.

In the condition shown at (a) of FIG. 2, the droplet 25 at the tip of the wire 5 has been transferred to the base metal 9. In other words, the condition shown at (a) of FIG. 2 is developed during the inter-group base period. The condition shown at (b) of FIG. 2 is developed in the early stage of the first pulse period. At this stage, the wire 5 is melted by the first pulse (high output pulse) and another droplet 25 is formed, and arc length 26 is long. At the final stage of the first pulse period, the droplet 25 grows further as shown in (c) of FIG. 2, and the arc length 26 becomes longer. At this time, the area 27 of anode spot becomes smaller. During the base period after the first pulse period, the welding output becomes lower, and the wire feeding speed becomes higher than the wire melting speed. Therefore, as shown in (d) of FIG. 2, the arc length 26 becomes shorter gradually. During the second pulse period, the arc length 26 becomes sufficiently short, and the area 27 of anode spot becomes larger as shown in (e) of FIG. 2. As a result, the class II pinch force 43 exerted on the droplet 25 becomes larger, and the droplet 25 is detached smoothly as shown in (g) of FIG. 2. This process is repeated during welding.

<<SECOND EMBODIMENT>>

Figure 3:
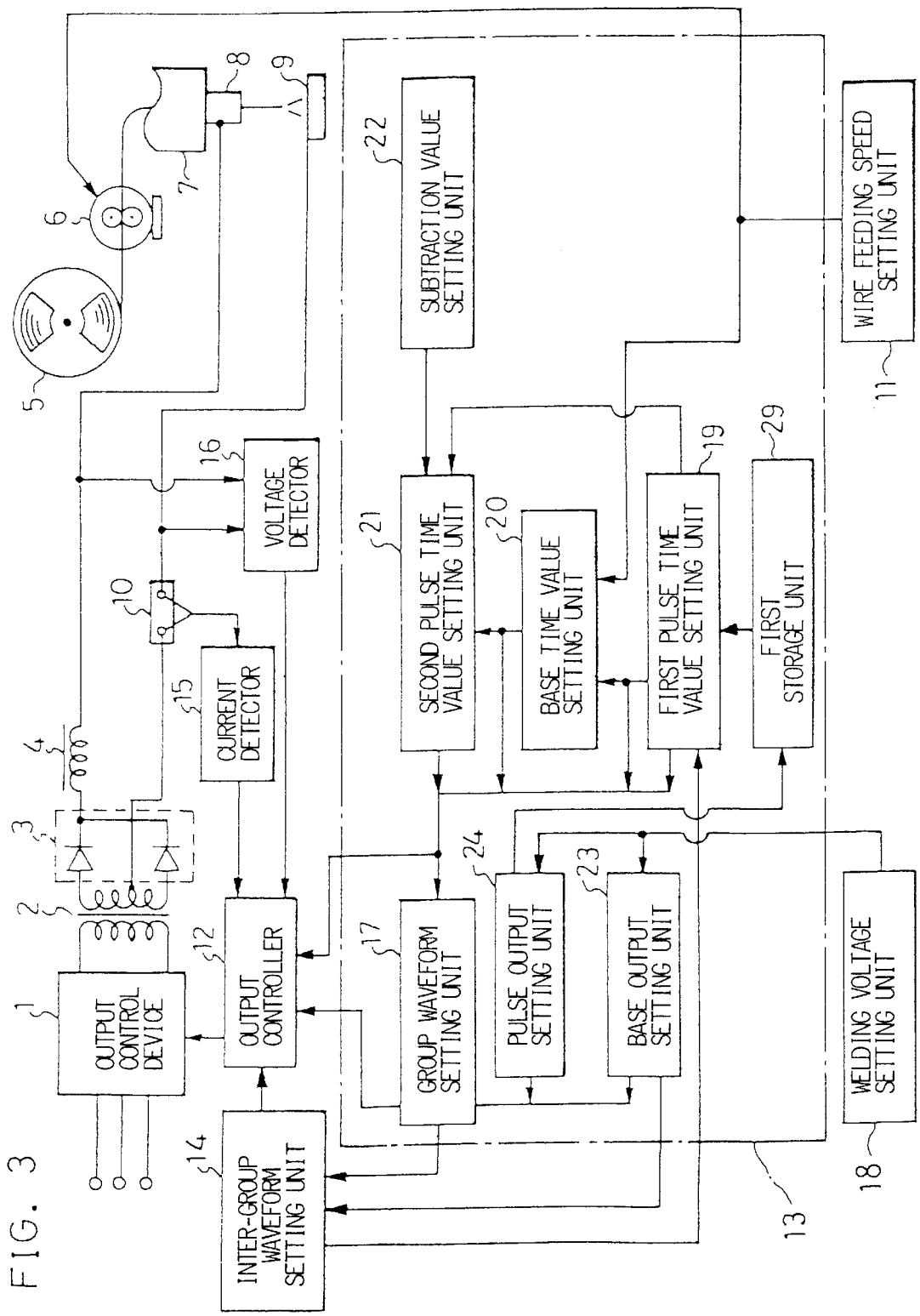
FIG. 3 is a block diagram showing a configuration of a consumable electrode type pulsed arc welder in a second embodiment of the present invention.

FIG. 3 is a block diagram showing a configuration of a consumable electrode type pulsed arc welder in a second embodiment of the present invention. In the configuration of the consumable electrode type pulsed arc welder of the present embodiment, a first storage unit is provided in the group waveform forming section without retaining the plurality of the first pulse time value TP1 corresponding to the feeding speed in the wire feed speeding setting unit. This first storage section memorizes the plurality of the first pulse time values TP1 respectively determined on the basis of the plurality of the pulse setting value VP previously. The other elements and portions are similar to those of the first embodiment, and therefore superposed descriptions on the similar points are omitted.

In FIG. 3, the plurality of the first pulse time value TP1 determined on the basis each of the plurality of the pulse setting value VP is previously stored in a first storage unit 29. The first storage unit 29 receives the pulse setting value VP from the pulse output setting unit 24, and selects an appropriate first pulse time value TP1 corresponding to the pulse setting value VP. The first storage unit 29 outputs the selected first pulse time value TP1 to the first pulse time value setting unit 19.

After the first pulse time value setting unit 19 receives the first pulse time value TP1 from the first storage unit 29, it starts to count a time when the first pulse time value setting unit 19 receives the inter-group waveform termination signal from the inter-group waveform setting unit 14 as same as that of the first embodiment. When the counted time value coincides with the first pulse time value TP1 from the first storage section 29, the first pulse time value setting unit 19 outputs the first count termination signal to the base time value setting unit 20 and the group waveform setting unit 17.

In order to form the droplet 25 having a predetermined amount during the first pulse period, the first pulse time value TP1 and the pulse setting value VP have been related to each other and determined by the below-mentioned equation (2), and stored in the first storage unit 29 previously. In the equation (2), V represents a melted amount of the wire 5, and α and β represent proportionality constants. Furthermore, d represents a length protruded from the tip end of the electrode 8 of the wire 5, and I represents the welding current.

$$V/t = \alpha I + \beta dI^2 \qquad (2)$$

The melting speed of the wire 5 (melting amount per time) is determined by an amount of heat (the first term on the right side) generated at the wire 5 due to the use of the wire 5 as the anode and heat generation (the second term on the right side) due to the resistance of a protrusion portion of the wire 5.

Therefore, the first pulse time value TP1 is related to the pulse setting value VP corresponding to the welding current I during the first pulse period, so that the amount V of the droplet during the first pulse period can be stably controlled to an appropriate value. In this way, in the consumable electrode type pulsed arc welder of the present embodiment, the droplet 25 can be detached stably by controlling the amount V of the droplet to an appropriate value. A calculator implemented by software or a calculator having a hardware configuration may be used instead of the first storage unit 29.

<<THIRD EMBODIMENT>>

Figure 4:
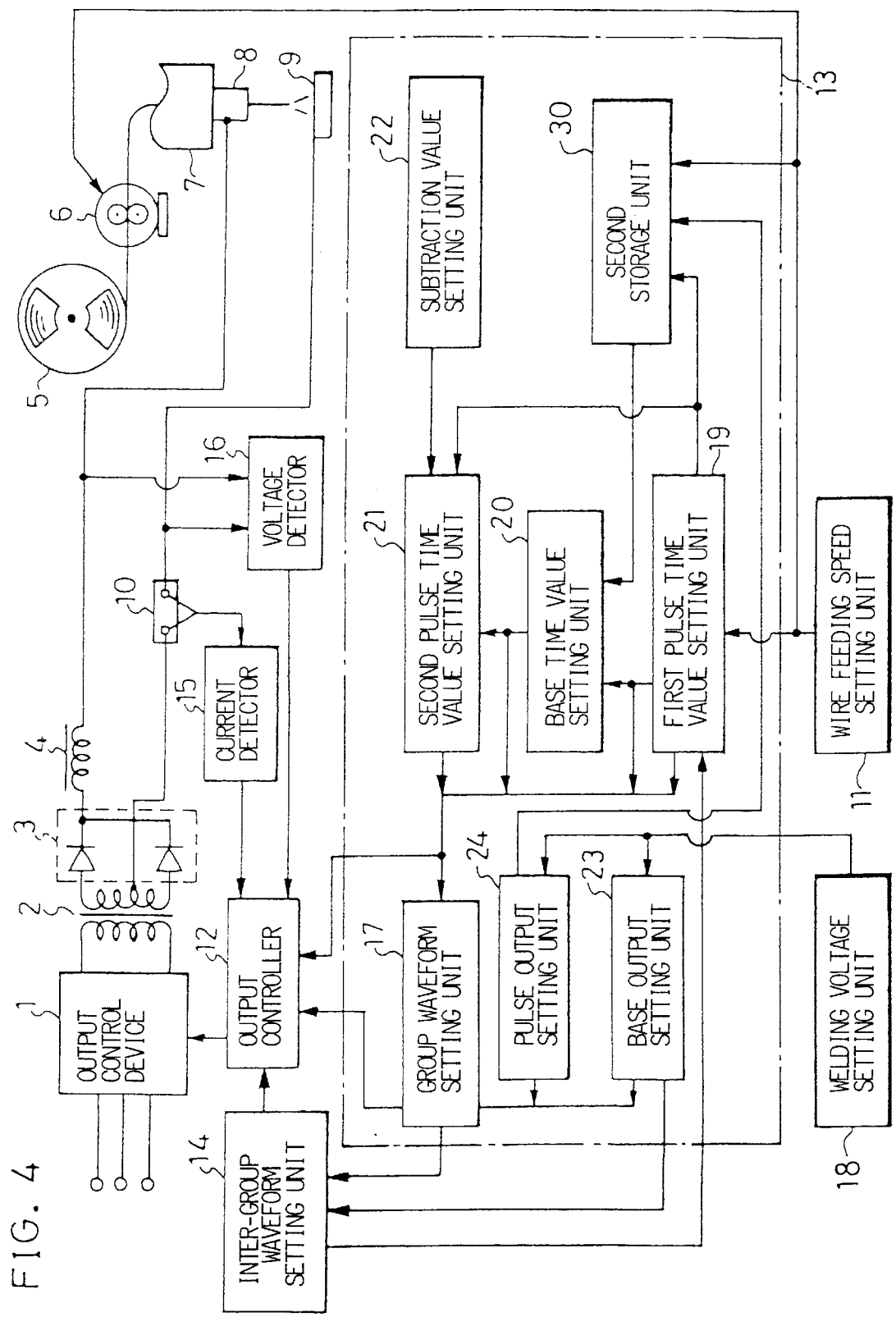
FIG. 4 is a block diagram showing a configuration of a consumable electrode type pulsed arc welder in a third embodiment of the present invention.

FIG. 4 is a block diagram showing a configuration of a consumable electrode type pulsed arc welder in a third embodiment of the present invention. In the configuration of the consumable electrode type pulsed arc welder of the present embodiment, a second storage section is provided in the group waveform forming section without retaining the plurality of the base time value TB1 corresponding to the feeding speed in the wire feeding speed setting unit. This second storage section memorizes the plurality of the base time value TB1 determined on the basis of the first pulse time value TP1, the pulse setting value VP and the wire feeding speed previously. The other elements and portions are similar to those of the first embodiment, and therefore superposed descriptions on the similar points are omitted.

In FIG. 4, the plurality each of the base time value TB1 determined on the basis of the first pulse time value TP1, the pulse setting value VP and the wire feeding speed is previously stored in a second storage unit 30. The second storage unit 30 receives the wire feeding speed, the first pulse time value TP1 and the pulse setting value VP from the wire feeding speed setting unit 11, the first pulse time setting unit 19 and the pulse output setting unit 24, respectively. The second storage unit 30 selects an appropriate base time value TB1 corresponding to these received values, and outputs the selected base time value TB1 to the base time setting unit 20.

After the base time value setting unit 20 receives the base time value TB1 from the second storage unit 30, it starts to count a time measurement when the base time value setting unit 20 receives the first count termination signal from the first pulse time value setting unit 19 as same as that of the first embodiment. When the counted time value coincides with the base time value TB1 from the second storage unit 30, the base time value setting unit 20 outputs the second count termination signal to the second pulse time value setting unit 21.

The melting amount during the first pulse period is determined by the first pulse time value TP1 and the pulse setting value VP as shown in the aforementioned equation (2). Therefore, the increment ΔL of the arc length during the first pulse period is represented by the functions of the first pulse period TP1, the pulse setting value VP and the wire feeding speed. In addition, the arc length required to be shortened during the base period is dependent on the increment ΔL of the arc length. Therefore, in the consumable electrode type pulsed arc welder of the present embodiment, any short circuiting is prevented, and the arc length is shortened more stably by calculating and setting the base time value TB1 on the basis of the first pulse time value TP1, the pulse setting value VP and the wire feed speed used as parameters.

<<FOURTH EMBODIMENT>>

Figure 5:
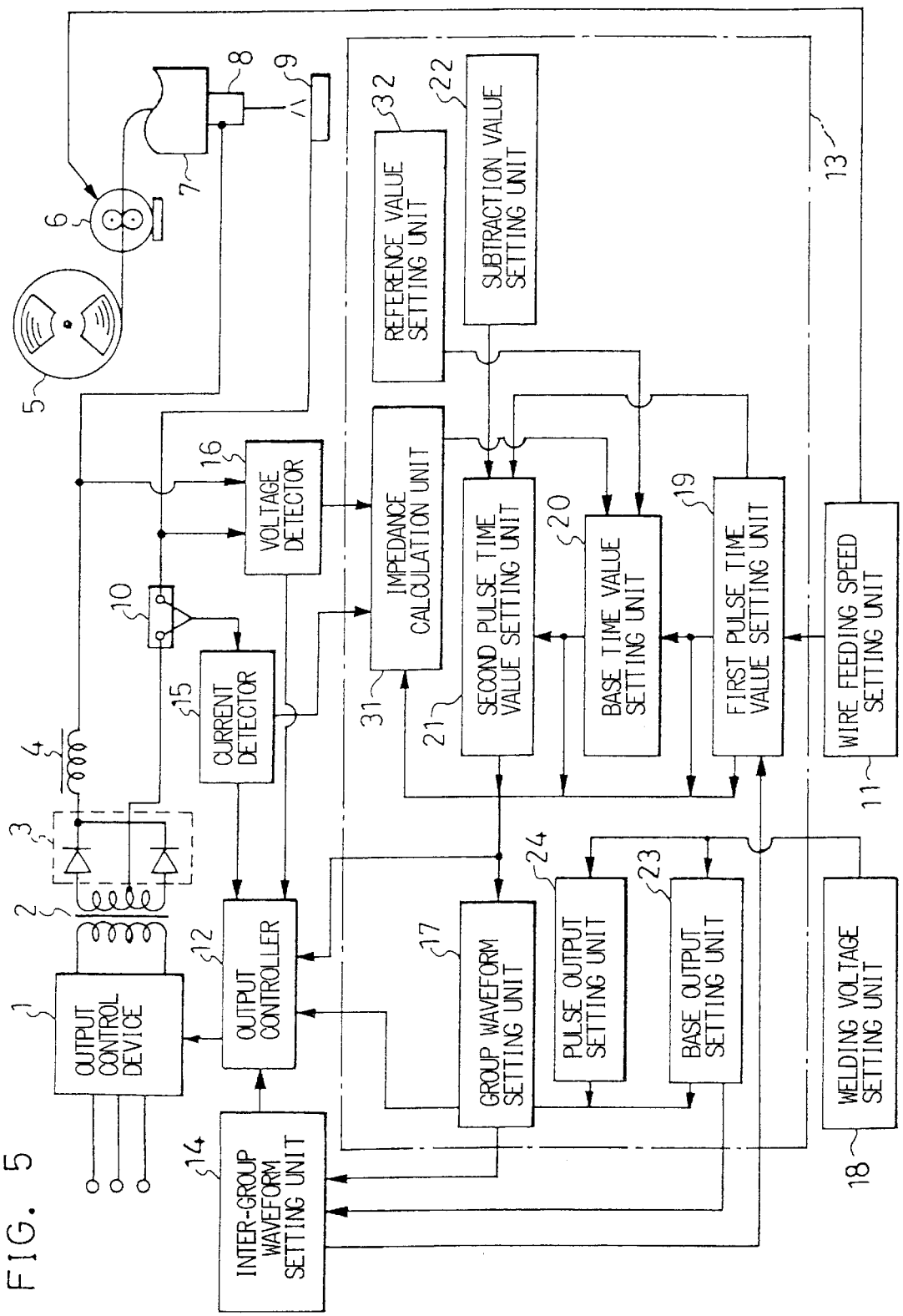
FIG. 5 is a block diagram showing a configuration of a consumable electrode type pulsed arc welder in a fourth embodiment of the present invention.

FIG. 5 is a block diagram showing a configuration of a consumable electrode type pulsed arc welder in a fourth embodiment of the present invention. In the configuration of the consumable electrode type pulsed arc welder of the present embodiment, an arc impedance detection section is provided in the group waveform forming section. With this configuration, the base period is ended without retaining the plurality of the base time value TB1 corresponding to the feeding speed in the wire feeding speed setting unit. The other elements and portions are similar to those of the first embodiment, and therefore superposed descriptions on the similar points are omitted.

In FIG. 5, an arc impedance detection section is configured by an impedance calculation unit 31 connected to the current detector 15 and the voltage detector 16, and a reference value setting unit 32 retaining an impedance reference value. The impedance calculation unit 31 receives the first count termination signal from the first pulse time value setting unit 19. Starting at the time of this signal reception, the impedance calculation unit 31 calculates the impedance of the welder on the basis of the current value from the current detector 15 and the voltage value from the voltage detector 16. The impedance calculation unit 31 calculates the impedance at intervals corresponding to the detection intervals of the current detector 15 and the voltage detector 16, and outputs the calculated impedance to the base time value setting unit 20 sequentially. When the impedance from the impedance calculation unit 31 becomes lower than the reference value from the reference value setting unit 32, the base time value setting unit 20 determines that a base period has ended, and outputs the second count termination signal to the second pulse time value setting unit 21.

The impedance reference value is calculated as described below, and set and stored in the reference value setting unit 32 previously.

In the case that the short circuiting occurs because of the wire 5 making contact with the base metal 9, the impedance calculated by the impedance calculation unit 31 is equal to the total of the impedance of the protrusion portion of the wire 5 and the impedance of the output cable between the voltage detector 16 and the impedance calculation unit 31. The impedance in the short-circuit condition is lower than the total impedance in the arc condition immediately before the occurrence of the short circuiting by the amount of the impedance of the arc 28 (hereinafter referred to as "arc impedance"). Therefore, the impedance reference value is set so as to add the impedance in the short-circuit condition to the arc impedance determined in consideration of a desired arc length.

With the above-mentioned configuration of the consumable electrode type pulsed arc welder in the present embodiment, the base period can be ended more stably in a condition wherein any short circuiting is prevented and the arc length is shortened.

Since the welding current is set constant when the current control is performed during the first base period, the impedance is equivalent to voltage drop. Therefore, when the current control is performed, the impedance calculation unit 31 can be omitted and the timing of ending the base period can be determined by using the voltage value from the voltage detector 16.

<<FIFTH EMBODIMENT>>

Figure 6:
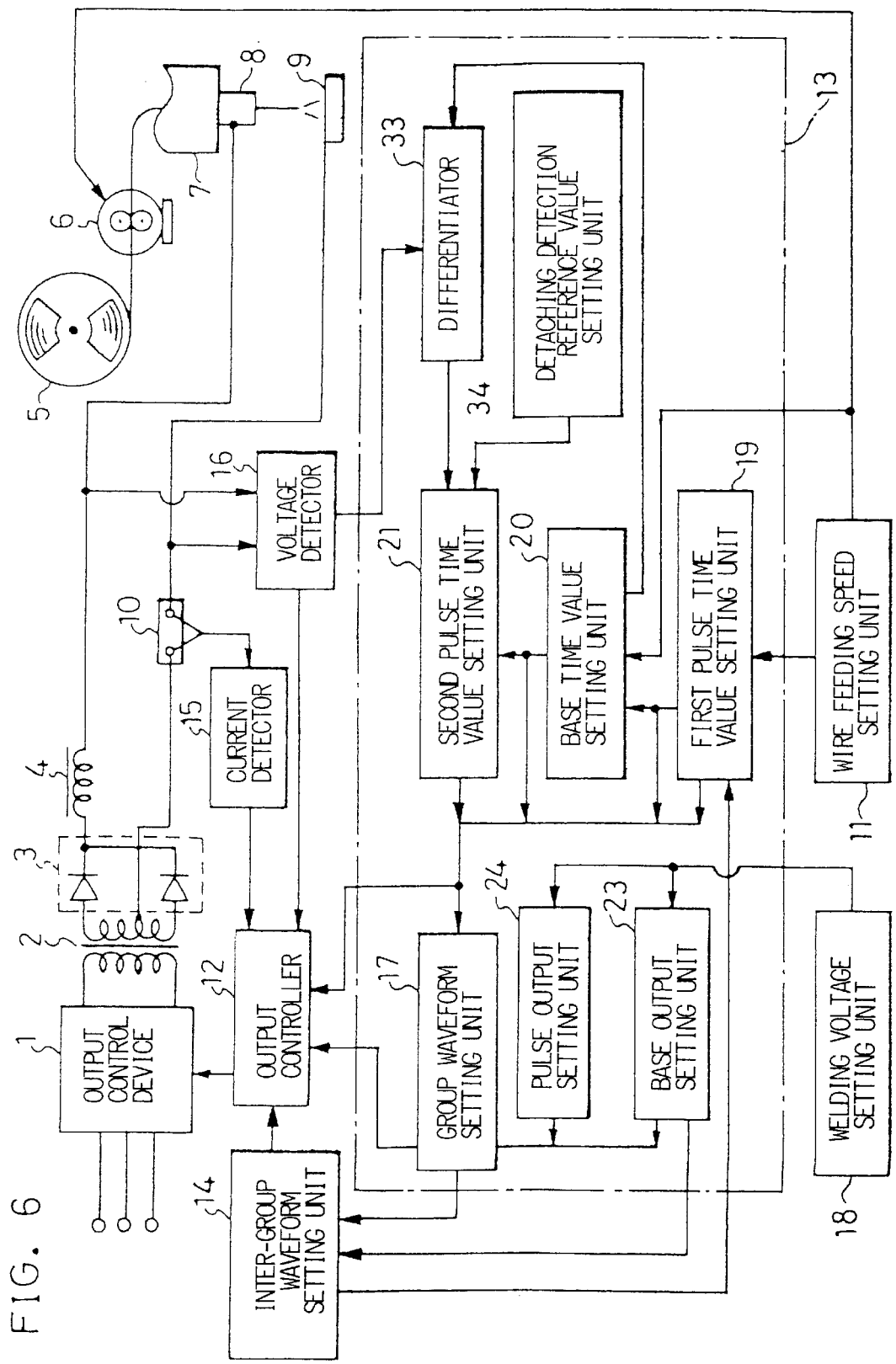
FIG. 6 is a block diagram showing a configuration of a consumable electrode type pulsed arc welder in a fifth embodiment of the present invention.

FIG. 6 is a block diagram showing a configuration of a consumable electrode type pulsed arc welder in a fifth embodiment of the present invention. In the configuration of the consumable electrode type pulsed arc welder of the present embodiment, a detaching detection section for detecting detaching of the droplet is provided in the group waveform forming section. With this configuration, the second pulse period is ended. The other elements and portions are similar to those of the first embodiment, and therefore superposed descriptions on the similar points are omitted.

In FIG. 6, a detaching detection section is configured by a differentiator 33 connected to the voltage detector 16, and a detaching detection reference value setting unit 34 retaining a reference value, i.e., a voltage value used for detecting detaching of the droplet 25. The differentiator 33 starts differentiating the detected signal of the welding voltage from the voltage detector 16 when the differentiator 33 receives the second count termination signal from the base time value setting unit 20. When an output value from the differentiator 33 exceeds the reference value from the detaching detection reference value setting unit 34, the second pulse time value setting unit 21 determines that the second pulse period is ended, and outputs the third count termination signal to the output controller 12 and the group waveform setting unit 17.

As has been explained in the above, in the consumable electrode type pulsed arc welder of the present embodiment, the timing of ending the second pulse period is set depending on the welding voltage being monitored. The timing of ending can be set accurately, because the arc length is extended abruptly when the droplet 25 is detached from the wire 5, whereby the welding voltage is increased or the welding current is decreased. In the embodiment shown in FIG. 6, an increase in the welding voltage is detected to set the timing of ending the second pulse period. Instead of detecting an increase in the welding voltage, a decrease in the welding current can be detected to set the timing of ending the second pulse period, as a matter of course.

In the consumable electrode type pulsed arc welder of the present embodiment, the second pulse period is ended at the detaching timing of the droplet 25. Therefore, an arc force exerted to the droplet 25, which is in an unstable state until it is absorbed into the weld pool on the base metal 9 after detaching, can be weakened to prevent the droplet from generating the spatter.

In the descriptions of the configurations of the above-mentioned first to fifth embodiments, the voltage control is performed, wherein the welding voltage based on the pulse setting value VP and the base setting value VB having been set during each of the first pulse period, the base period and the second pulse period is made constant. However, the current control for making the welding current constant may also be performed in each period.

Furthermore, the setting of the first pulse time value TP1 in the second embodiment shown in FIG. 3, the setting of the base time value TB1 in the third and fourth embodiments shown in FIGS. 4 and 5, and the setting of the second pulse time value TP2 in the fifth embodiment shown in FIG. 6 have configurations different from those of the first embodiment shown in FIG. 1. However, these configurations may be combined appropriately.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A pulsed arc welder for outputting pulses to a consumable electrode and melting said consumable electrode to weld a base metal comprising:

a group waveform forming means for forming a pulse waveform group, an output means for applying at least one of a welding current and a welding voltage to said consumable electrode in accordance with a duty cycle of said pulse waveform group, said pulse waveform group comprising a first pulse period to form a droplet of a predetermined amount at an end of said consumable electrode, a base period to shorten an arc length between said droplet and said base metal, a second pulse period to detach said droplet, the duration of said first pulse period being dependent upon a feeding speed of said consumable electrode, the duration of said base period being dependent upon the feeding speed of said consumable electrode, the duration of said second pulse period being set to be shorter than that of said first pulse period, and the output level of said second pulse being the same as that of said first pulse.

2. A pulsed arc welder in accordance with claim 1 further comprising a pulse output setting means for setting a pulse output level (VP) during said first pulse period, the duration of said first pulse period being determined by said first pulse output level during said first pulse period.

3. A pulsed arc welder in accordance with claim 1 further comprising a pulse output setting means for setting a pulse output level (VP) during said first pulse period, the duration of said base period being determined by the pulse output level (VP) during said first pulse period, the duration of said first pulse period and the feeding speed of said consumable electrode.

4. A pulsed arc welder in accordance with claim 1 further comprising arc impedance detection means for detecting the impedance of an arc during said base period so that a base time value setting unit ends said base period by an output signal of said arc impedance detection means.

5. A pulsed arc welder in accordance with claim 1, further comprising a detaching detection means for detecting the detaching of said droplet so that a second pulse time value settings unit ends said second pulse period by an output signal of said detaching detection means.

6. A method for controlling a pulsed arc welder for outputting pulses to a consumable electrode and melting said consumable electrode to weld a base metal, comprising:
   forming a pulse waveform group,
   applying said pulse waveform group to said consumable electrode comprising at least one of a welding current and a welding voltage,
   said pulse waveform group comprising a first pulse period to form a droplet of a predetermined amount at an end of said consumable electrode, a base period to shorten an arc length between said droplet and said base metal, and a second pulse period to detach said droplet.

* * * * *